US005488493A

United States Patent [19]

Moss

[11] Patent Number: 5,488,493
[45] Date of Patent: Jan. 30, 1996

[54] HOLOGRAPHIC CHMSL INCLUDING A HOLOGRAM ASSEMBLY AND A REFRACTIVE ELEMENT LAMINARLY ATTACHED THERETO FOR DIVERGING ZERO ORDER BEAM

[75] Inventor: Gaylord E. Moss, Marina del Rey, Calif.

[73] Assignee: Hughes Aircraft Company, Los Angeles, Calif.

[21] Appl. No.: 146,244

[22] Filed: Nov. 1, 1993

[51] Int. Cl.$^6$ .............................. G03H 1/00; G02B 5/32; B60Q 1/44; B60Q 1/26

[52] U.S. Cl. .................. 359/13; 359/15; 359/19; 359/22; 340/479; 362/80.1

[58] Field of Search ...................... 340/468, 479; 362/80.1; 359/13–15, 19, 22, 742, 710

[56] References Cited

U.S. PATENT DOCUMENTS

| | | | |
|---|---|---|---|
| 5,101,193 | 3/1992 | Smith | 340/479 |
| 5,347,435 | 9/1994 | Smith et al. | 359/15 |

*Primary Examiner*—Frank Gonzalez
*Assistant Examiner*—Jason D. Eisenberg
*Attorney, Agent, or Firm*—Leonard A. Alkov; W. K. Denson-Low

[57] ABSTRACT

A holographic center high mounted stoplight system that includes a light source for providing a nearly collimated beam, an expanding lens responsive to the nearly collimated beam for providing a diverging or converging reconstruction beam, and a stoplight hologram responsive to the expanding beam for producing stoplight illumination. Also disclosed is a holographic center high mounted stoplight system that includes a light source for providing a nearly collimated beam, a light bending hologram for providing a diffracted near collimated beam, and an expanding stoplight lens array responsive to the diffracted near collimated beam for providing non-collimated stoplight illumination.

16 Claims, 5 Drawing Sheets

HOLOGRAPHIC CHMSL INCLUDING A HOLOGRAM ASSEMBLY AND A REFRACTIVE ELEMENT LAMINARLY ATTACHED THERETO FOR DIVERGING ZERO ORDER BEAM

BACKGROUND OF THE INVENTION

The disclosed invention is directed generally to holographic center high mounted stoplights for vehicles, and more particularly to a holographic center high mounted stoplight that includes a source of nearly collimated light and an expanding lens to produce an ultimately diverging reconstruction beam from the nearly collimated light.

Present federal regulations require center high mounted stoplights (CHMSLs) in addition to the standard stoplights mounted in the rear portion of an automobile. The high mounted stoplights are intended to maximize the visibility of the automobile braking indicators to drivers following the braking vehicle, and are commonly mounted on or near the rear window of an automobile.

High mounted stoplights have commonly been implemented as a standard lenticular lens, a red filter, an illuminating incandescent bulb, and a reflector enclosed in a housing that is typically secured adjacent the top or bottom of an automobile rear window. However, the bulky housing partially obscures the rearward vision of the driver, and moreover imposes limitations on the design of the automobile.

Center high mounted stoplights have been also integrated into automobile body parts such as rear decks, spoilers, roofs, which to some degree substantially reduce or remove the rearward vision problem. However, such stoplights are complex and may impose limitations on the design of the automobile.

Holographic center high mounted stoplights have also been developed in order to efficiently meet the stoplight regulations. Known holographic center high mounted stoplights include those which utilize a nearly collimated reconstruction beam for efficient utilization of the light output of an incandescent bulb, and for compactness of the stoplight hologram. However, a consideration with the use of a collimated reconstruction beam is the potential hazard of the zero order (non-diffracted) reconstruction illumination that is transmitted by the stoplight hologram. As is well known, holograms have rather restrictive requirements for both wavelength and angle of the reconstruction light. These requirements would not normally be met by all of the light emitted by a standard light source, and thus a significant amount of light is not diffracted by a hologram. The non-diffracted light could comprise near collimated light of high intensity that could have a temporary blinding effect on the driver of a vehicle that is following a vehicle whose holographic stoplight is activated.

A possible implementation utilizing a non-collimated reconstruction beam would involve the use of a reflector that produces a diverging beam. However, this would require an inordinately larger stoplight hologram, or a reflector would having unacceptably reduced collection efficiency as a result of the space constraints.

SUMMARY OF THE INVENTION

It would therefore be an advantage to provide an efficient holographic center high mounted stoplight system that does not emit collimated illumination.

The foregoing and other advantages are provided by the invention in a holographic stoplight system that includes a light source for providing a nearly collimated beam, an expanding lens responsive to the nearly collimated beam for providing a non-collimated reconstruction beam, and a stoplight hologram responsive to the non-collimated reconstruction beam for producing stoplight illumination.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
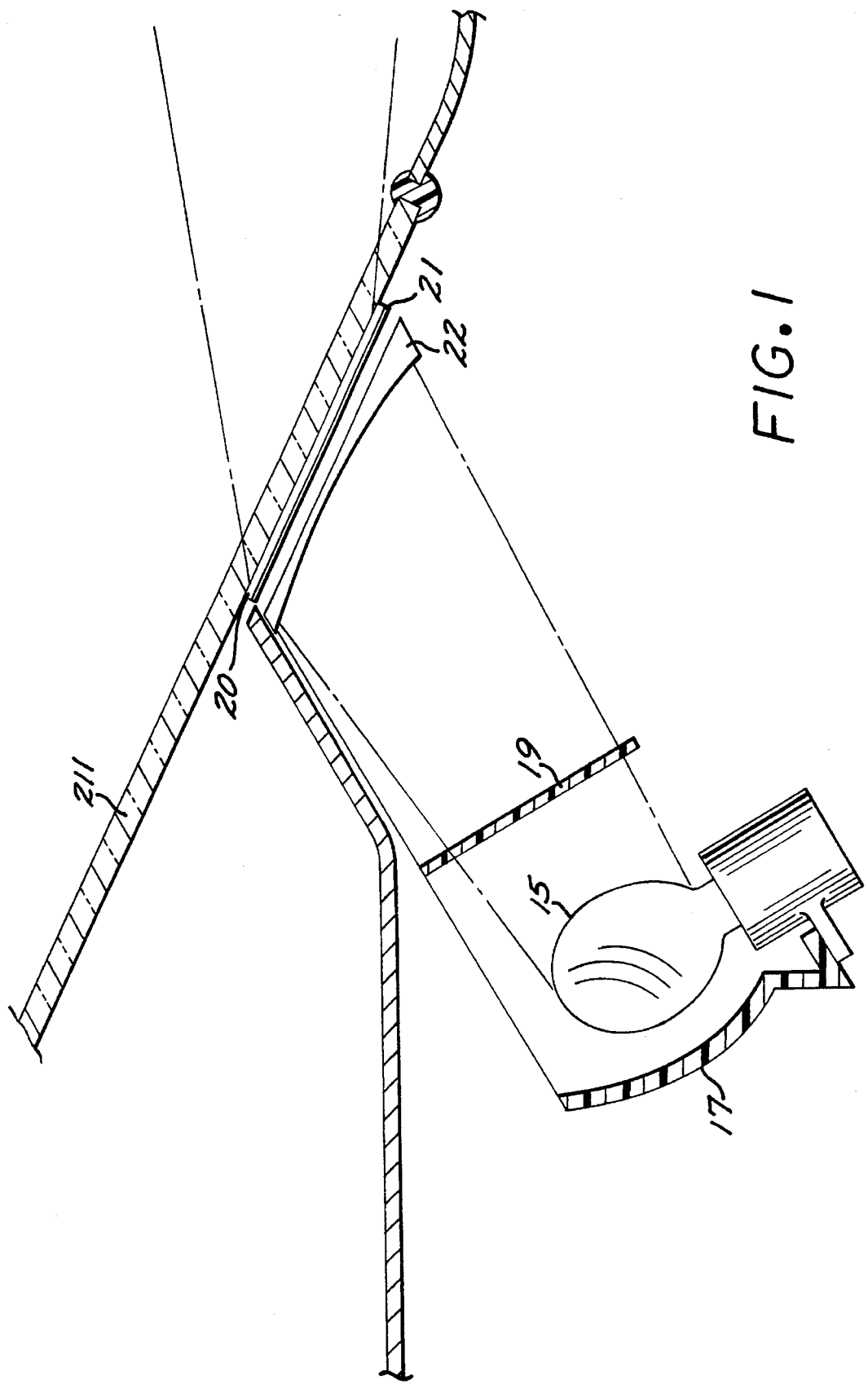
FIG. 1 sets forth a schematic sectional view illustrating a holographic vehicle center high mounted stoplight system in accordance with the invention.

In the following detailed description and in the several figures of the drawing, like elements are identified with like reference numerals.

The subject invention is generally directed to center high mounted stoplight systems wherein a hologram is illuminated with reconstruction illumination. It is conventionally known in the art that a hologram and the optical components utilized to provide reconstruction illumination are designed as a complete unit, and thus it should be appreciated that the hologram and optical reconstruction components of a stoplight system in accordance with the invention are to be designed as a complete unit.

Referring now to FIG. 1, shown therein is a center high mounted stoplight system in accordance with the invention which includes an incandescent lamp 15, such as a quartz halogen bulb, a parabolic reflector 17 that cooperates with the filament of the incandescent lamp 15 to provide a near collimated beam, a high pass filter 19 having a cutoff wavelength of about 600 nanometers (nm) and responsive to the collimated beam output of the illumination source, an expanding lens 22 responsive to the output of the high pass filter 19 for providing an ultimately expanding reconstruction beam, a stoplight hologram assembly 20 for diffracting a portion of the reconstruction beam output of the expanding lens to produce stoplight illumination, and a protective layer 21 disposed over the hologram assembly. The incandescent lamp 15 is connected to the brake light actuating circuit of the automobile so as to be energized when the brake pedal is depressed, such that stoplight illumination is produced pursuant to depression of the brake pedal. As a result of the the high pass filter 19 and the wavelength dependent sensitivity of human vision, the image provided by the stoplight hologram assembly 20 will be perceived as red, with the apparent peak intensity being somewhere between about 610 and 620 nm. Simply stated, the high pass filter is a red filter.

For ease of reference, the terms "ultimately expanding" and "expanding" refer to a beam that ultimately spreads, and thus refers to the output of a negative lens as well as the output of a positive lens, insofar as the output of a positive lens converges to a focus and then diverges. The reconstruction illumination at the hologram assembly is diverging for a negative lens, and is converging for a positive lens whose focus is after the hologram assembly. A purpose of the invention is the transformation of collimated illumination to diverging illumination to reduce the brightness of the undiffracted, or zero order, beam, so as to avoid the potentially hazardous effects of collimated illumination on the vision of an operator of a vehicle that is behind a vehicle in which a stoplight system of the invention is installed.

In accordance with the invention, the expanding lens is located as close as practicable to the hologram assembly 20, for example within 0.1 inches, or on the hologram assembly, and is either a negative lens that provides a diverging beam at the hologram assembly, or a positive lens that provides a converging beam that converges to a focus, for example after the hologram assembly, and then diverges. FIG. 1 depicts the particular example of an expanding lens that comprises a plano-concave negative lens. To the extent that a positive lens such as a plano-convex lens can also be utilized to provide an ultimately expanding reconstruction beam, the positive lens should have a focus that is close to the hologram assembly, for example within 12 inches of the output side of the hologram assembly, so as to reduce the brightness of the undiffracted light that passes through the hologram assembly 20. The expanding lens 22 is preferably a cylindrical lens whose cylinder axis is perpendicular to the plane of FIG. 1 such that its expanding output expands only along the vertical axis. Alternatively, the expanding lens 22 can be some other form of aspherical lens, or it can be a spherical lens.

The stoplight hologram assembly 20 comprises at least one volume hologram, and to the extent the stoplight hologram assembly 20 comprises a plurality of volume holograms, they can be formed in a single hologram layer or in individual layers, in which case the individual layers are laminarly stacked together. The hologram assembly 20 is constructed to provide, when illuminated by the reconstruction beam from the expanding lens, a stoplight image that is visible from behind the automobile over the appropriate vertical and horizontal viewing field. It should appreciated that in accordance with common knowledge in the art, the hologram assembly of the stoplight system of FIG. 1, as well as any hologram assembly utilized in the subject invention, is designed and constructed for the particular reconstruction beam chosen.

By way of illustrative example, the hologram assembly 20 is secured to the inside surface of an automobile rear window 211, while the incandescent lamp 15, the parabolic reflector 17, and the high pass filter 19 are mounted forward of the hologram assembly 20 and out of the rearward viewing angle of the driver, for example, beneath the generally horizontal rear deck that is adjacent the lower portion of the rear window 211 of the automobile. By way of illustrative example, the incandescent lamp 15, the parabolic reflector 17, the high pass filter 19, and the expanding lens 22 can be configured as an integral assembly. Also, the hologram assembly could alternatively be supported by the expanding lens 22. As a further alternative, the expanding lens 22, the protective layer, and the hologram assembly are laminarly secured to each other to form laminar assembly that is attached to the rear window with the hologram assembly closest to the window.

Figure 2:
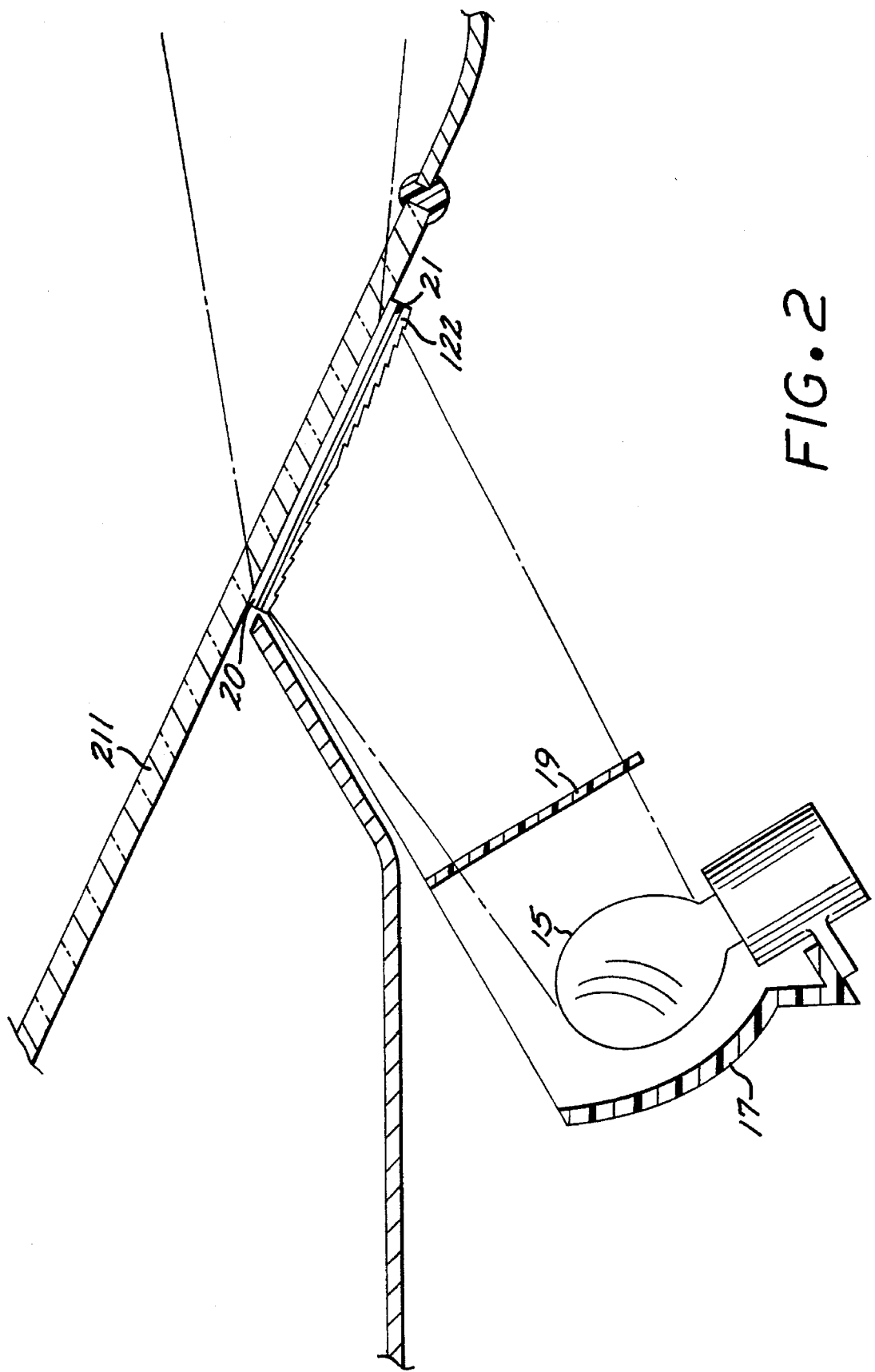
FIG. 2 sets forth a schematic sectional view illustrating a holographic vehicle center high mounted stoplight system in accordance with the invention that includes an expanding Fresnel lens.

Referring now to FIG. 2, schematically depicted therein is a further holographic stoplight system in accordance with the invention. The system of FIG. 2 is similar to that of FIG. 1, except that an ultimately expanding reconstruction beam is provided by an expanding Fresnel lens 122. By way of illustrative example, the hologram assembly 20 is secured to the inside surface of an automobile rear window 211, and the Fresnel lens 22 is secured to the protective layer 21 for the hologram assembly 20, such that the laminar structure comprising the hologram assembly 20, the protective layer 21, and the expanding Fresnel lens is supported by the rear window 211.

As an alternative implementation, the expanding Fresnel lens 122 can be separate from the hologram assembly 20 and as close as practicable to the hologram assembly, for example within 0.1 inches. As a further alternative, the expanding Fresnel lens 122 and the hologram assembly can be laminarly attached to each other and supported by structure other than the rear window, for example integrally with the incandescent lamp 15, the parabolic reflector 17, and the high pass filter 19.

The expanding Fresnel lens is preferably a cylindrical lens whose cylinder axis is perpendicular to the plane of FIG. 1 such that its expanding output expands only along the vertical axis. Alternatively, the expanding Fresnel lens can be some other form of aspherical lens, or it can be a spherical lens.

Figure 3:
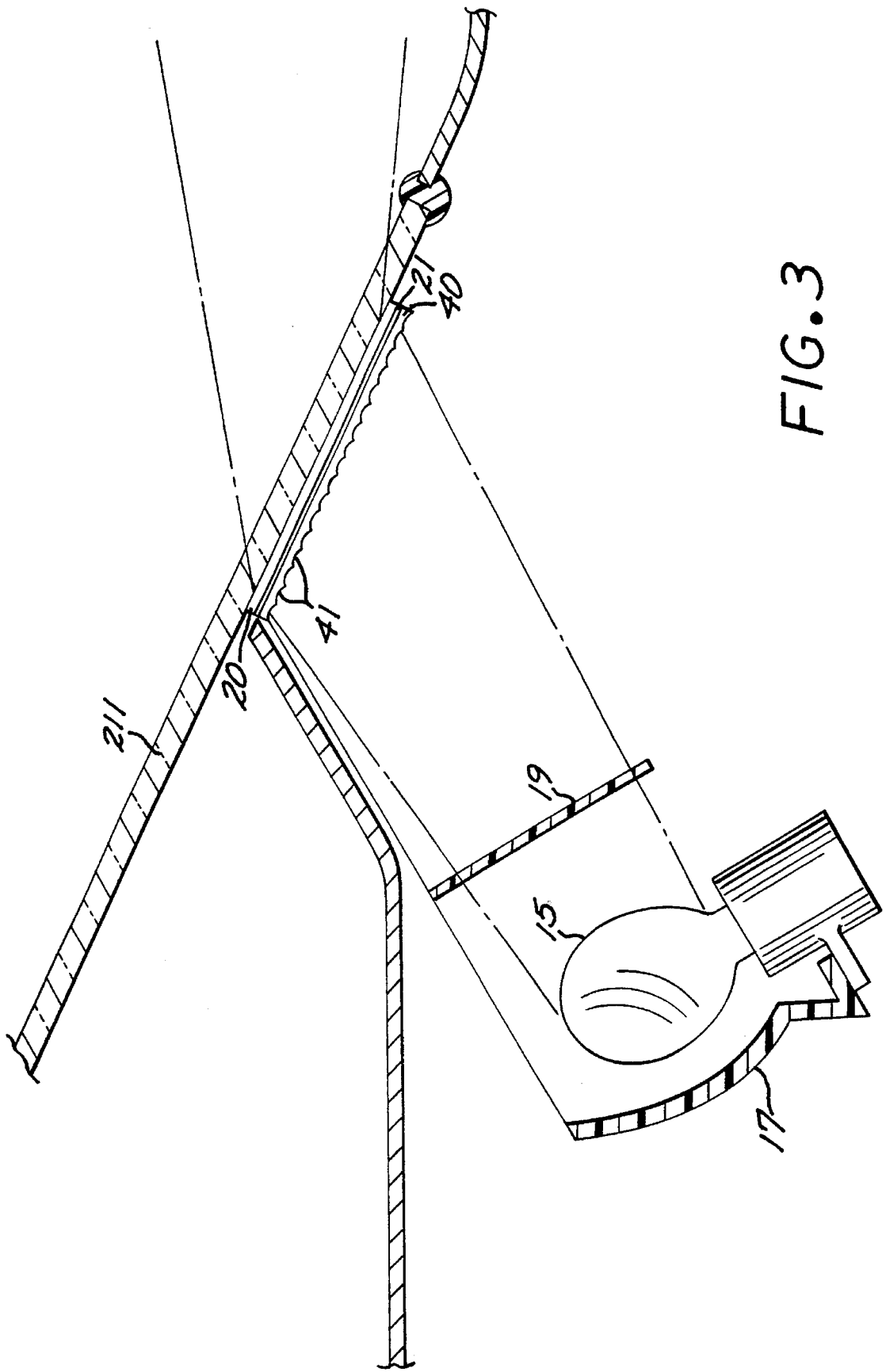
FIG. 3 sets forth a schematic sectional view illustrating a holographic vehicle center high mounted stoplight system in accordance with the invention that includes an array of cylindrical expanding lenses.
Figure 4:
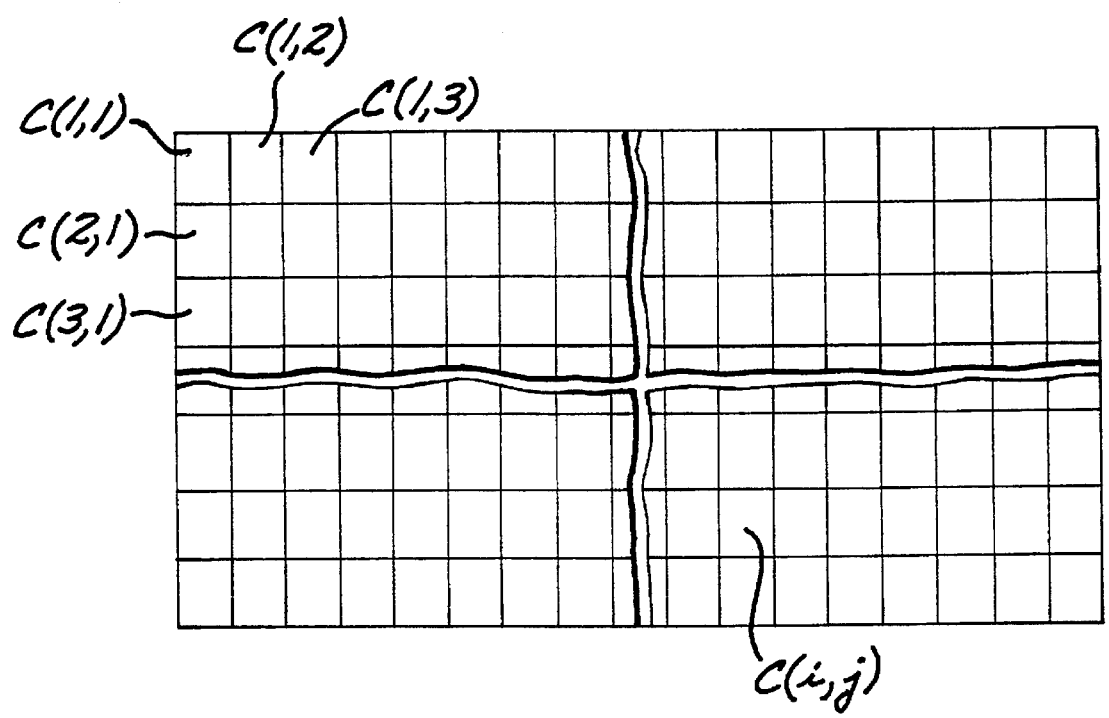
FIG. 4 schematically illustrates the organization of the cells of the hologram assembly of the holographic center high mounted stop light of FIG. 3.

Referring now to FIG. 3, set forth therein is another holographic stoplight system in accordance with the invention. The holographic stoplight system of FIG. 3 is similar to the system of FIG. 2, except that the hologram assembly 20 is comprised of a rectilinear array or grid of non-overlapping contiguous hologram cells or facets C(i,j) of identical size as shown in FIG. 4. By way of reference, the top row of hologram cells C(1,j) in the figure comprises the top of the hologram 20 as it is positioned in the installed hologram assembly of the stoplight system, and each row of hologram cells is generally aligned with the horizontal. In accordance with the invention, each of the rows of the hologram cells is illuminated with an ultimately expanding beam produced by a respective negative or positive cylindrical lens 41 contained in an array 40 which is schematically illustrated for the particular example of negative cylindrical lenses. The cylinder axes of the cylindrical lenses 41 are perpendicular to the plane of FIG. 3, and the array 40 is preferably as close as practicable to the hologram assembly, for example within 0.1 inches. The number of cylindrical lenses is equal to the number of cell rows, and each lens matches a respective cell row in size and position, such that horizontal edges of the cell rows and the cylindrical lenses are aligned. To the extent that the holographic stoplight system of FIG. 3 is implemented in with positive cylindrical lenses, the foci of the lenses should be close to the stoplight hologram assembly, for example within one inch of the output side of the stoplight hologram assembly.

The holographic stoplight of FIG. 3 can alternatively be implemented with an expanding cylindrical Fresnel lens instead of the array 40 of cylindrical lenses, wherein the number of lens facets is equal to the number of cell rows, and each lens facet matches a respective cell row in size and position, such that horizontal edges of the cell rows and the lens facets are aligned. It should be appreciated that a hologram assembly comprised of hologram cells as shown in FIG. 4 can be utilized in the holographic stoplight system of FIGS. 1 and 2.

As with the systems of FIGS. 1 and 2, the expanding lens of the system of FIG. 3 can be laminarly attached with the protective layer and the hologram assembly to form a laminar assembly that is attached to the rear window of a vehicle with the hologram assembly closest to the rear window.

While separate high pass filters have been shown in the holographic stoplight systems of FIGS. 1, 2 and 3, it is contemplated that the expanding lenses or the protective layers of such systems can be configured to provide the filtering function by forming either the expanding lens or the protective layer of a material having a high pass filter characteristic with a cutoff wavelength of about 600 nanometers (nm), in which case the separate high pass filter can be omitted.

Figure 5:
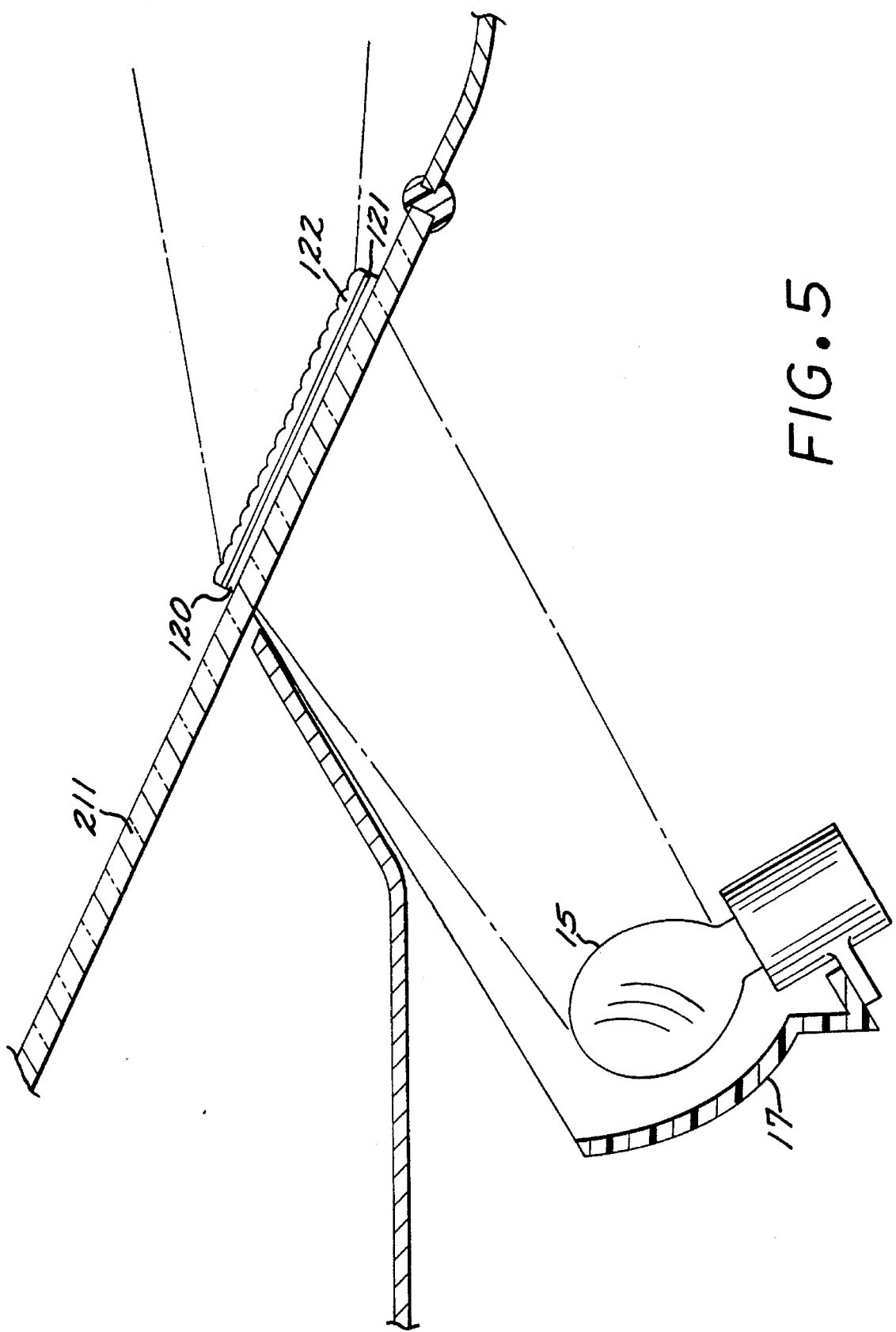
FIG. 5 sets forth a schematic sectional view illustrating a holographic vehicle center high mounted stoplight system in accordance with the invention that includes a light bending hologram and a refractive expanding stoplight lens.

Referring now to FIG. 5, set forth therein is a further holographic stoplight system in accordance with the invention. The holographic stoplight system of FIG. 4 includes an incandescent lamp 15, such as a quartz halogen bulb, a parabolic reflector 17 that cooperates with the filament of the incandescent lamp 15 to provide a near collimated beam, a light bending hologram assembly 120 for diffracting a portion of the near collimated beam, a refractive lenticular stoplight lens 122 that produces stoplight illumination pursuant to being illuminated by the diffracted output of the light bending hologram assembly 120, and a protective layer 121 interposed between the light bending hologram and the refractive stoplight lens. The refractive lenticular stoplight lens 122 is formed of a material having a high pass filter characteristic with a cutoff wavelength of about 600 nanometers (nm), and as a result of the wavelength dependent sensitivity of human vision, the light output of the refractive stoplight lens 122 will be perceived as red, with the apparent peak intensity being somewhere between about 610 and 620 nm. The incandescent lamp 15 is connected to the brake light actuating circuit of the automobile so as to be energized when the brake pedal is depressed, such that stoplight illumination is produced pursuant to depression of the brake pedal.

The incandescent lamp 15 and the parabolic reflector 17 are mounted forward of the light bending hologram 120 and the refractive stoplight lens 121, and out of the rearward viewing angle of the driver, for example, beneath the generally horizontal rear deck that is adjacent the lower portion of the rear window 211 of the automobile.

The light bending hologram 120 is adhesively secured to the outside of the rear window 211 of the vehicle in which the stoplight system of FIG. 5 is installed, with the protective layer 121 facing outwardly, and the stoplight lens 122 is in turn adhesively secured to the protective layer 121. Alternatively, the laminar structure comprising the light bending hologram, the protective layer, and the refractive stoplight lens can be appropriately supported inside the vehicle adjacent the rear window 211. The refractive stoplight lens 122 comprises, for example, an array of negative or positive lenslets, schematically shown as positive lenslets, that cooperate with the output of the light bending hologram 119 to direct stoplight illumination into the appropriate viewing angle. To the extent that the refractive stoplight lens is comprised of positive lenslets, the foci of the lenlets are within about an inch of the lenlets.

The foregoing has been a disclosure of a holographic center high mounted stoplight system that allows for efficient use of collimated illumination while avoiding the potential hazard of inadvertent viewing of collimated illumination.

Although the foregoing has been a description and illustration of specific embodiments of the invention, various modifications and changes thereto can be made by persons skilled in the art without departing from the scope and spirit of the invention as defined by the following claims.

What is claimed is:

1. A holographic stoplight system comprising:

means for providing a near collimated beam;

an expanding lens responsive to the nearly collimated beam for providing a diverging reconstruction beam;

a stoplight hologram assembly responsive to the diverging reconstruction beam for producing stoplight illumination; and wherein said expanding lens and said hologram assembly are laminarly attached to each other.

2. The holographic stoplight system of claim 1 wherein said expanding lens comprises a negative lens.

3. The holographic stoplight system of claim 2 wherein said negative lens is a cylindrical lens.

4. The holographic stoplight system of claim 2 wherein said negative lens is a Fresnel lens.

5. The holographic stoplight system of claim 1 wherein said expanding lens comprises a positive lens that provides a converging beam that converges to a focus that is close to the hologram assembly, wherein said converging beam thereafter diverges.

6. The holographic stoplight system of claim 5 wherein said positive lens is a cylindrical lens.

7. The holographic stoplight system of claim 5 wherein said positive lens is a Fresnel lens.

8. The holographic stoplight system of claim 1 wherein said laminarly attached expanding lens and hologram assembly are secured to a rear window of a vehicle.

9. The holographic stoplight system of claim 1 wherein said expanding lens comprises a red filter.

10. A holographic stoplight system comprising:

a source of near collimated light;

an array of holographic cells arranged in rows and columns;

an array of cylindrical lenses respectively associated with the rows of said array of holographic cells and responsive to said near collimated light for illuminating each row of said array of holographic cells with a respective diverging reconstruction beam; and wherein said array of cylindrical lenses and said array of holographic cells are laminarly attached to each other.

11. The holographic stoplight system of claim 10 wherein said array of cylinder lenses comprises an array of negative cylinder lenses.

12. The holographic stoplight system of claim 10 wherein said array of cylinder lenses comprises an array of positive cylinder lenses 13. The holographic stoplight system of claim 10 wherein said laminarly attached array of cylinder lenses array and array of hologram cells are secured to a rear window of a vehicle.

14. The holographic stoplight system of claim 10 wherein said array of cylinder lenses comprises a red filter.

15. A holographic stoplight system comprising:

means for providing a near collimated beam;

a light bending hologram responsive to said near collimated beam for producing a diffracted near collimated beam;

a refractive stoplight lens responsive to said diffracted near collimated beam for producing stop-light illumination; and wherein said light bending hologram and said refractive stoplight lens are laminarly attached to each other.

16. The holographic stoplight system of claim 15 wherein said light bending hologram and stoplight lens are secured to a rear window of a vehicle.

* * * * *